United States Patent [19]
Singhal

[11] Patent Number: 6,069,614
[45] Date of Patent: May 30, 2000

[54] MAN MACHINE INTERFACE VIA DISPLAY PERIPHERAL

[76] Inventor: Tara C Singhal, P.O. Box 5075, Torrance, Calif. 90510

[21] Appl. No.: 08/710,388

[22] Filed: Sep. 16, 1996

Related U.S. Application Data

[63] Continuation-in-part of application No. 08/433,992, May 4, 1995.

[51] Int. Cl.[7] ........................................................ G09G 5/08
[52] U.S. Cl. .......................... 345/158; 345/159; 345/163; 340/825.72; 341/22; 348/734
[58] Field of Search ..................................... 345/158, 159, 345/160, 163, 157; 341/22; 348/734; 340/825.72

[56] References Cited

U.S. PATENT DOCUMENTS

| | | |
|---|---|---|
| D. 298,749 | 11/1988 | Yant . |
| D. 328,463 | 8/1992 | King et al. . |
| 4,509,043 | 4/1985 | Mossaides ................................. 345/113 |
| 4,812,829 | 3/1989 | Ebina et al. ............................... 345/159 |
| 4,931,781 | 6/1990 | Miyakawa .................................. 341/22 |
| 4,931,783 | 6/1990 | Atkinson ................................... 345/163 |
| 5,228,077 | 7/1993 | Darbee ...................................... 348/734 |
| 5,253,068 | 10/1993 | Crook et al. .............................. 348/734 |
| 5,296,871 | 3/1994 | Paley ......................................... 345/163 |
| 5,307,055 | 4/1994 | Baskin et al. ................................ 345/1 |
| 5,367,316 | 11/1994 | Ikezaki ...................................... 345/158 |
| 5,412,377 | 5/1995 | Evans et al. ......................... 340/825.72 |
| 5,471,254 | 11/1995 | Claassen ................................... 348/734 |
| 5,477,508 | 12/1995 | Will ........................................... 368/189 |
| 5,506,605 | 4/1996 | Paley ......................................... 345/158 |
| 5,534,865 | 7/1996 | Kriegsman et al. ...................... 341/176 |
| 5,537,463 | 7/1996 | Escobosa et al. .................... 379/102.01 |
| 5,565,891 | 10/1996 | Armstrong ................................ 345/167 |
| 5,602,597 | 2/1997 | Bertram ..................................... 348/565 |
| 5,606,374 | 2/1997 | Bertram ..................................... 348/565 |
| 5,650,831 | 7/1997 | Farwell ...................................... 348/734 |
| 5,652,630 | 7/1997 | Bertram et al. ........................... 348/734 |
| 5,657,091 | 8/1997 | Bertram ..................................... 348/559 |
| 5,668,574 | 9/1997 | Jarlance-Huang ........................ 345/158 |

Primary Examiner—Jeffery A. Hofsass
Assistant Examiner—John Tweel, Jr.
Attorney, Agent, or Firm—Law Office of Steven G. Roeder

[57] ABSTRACT

An improved man machine interface for computer, television, electronic games and appliances, allowing rapid, easy and natural control and selections from a large array of choices. The remote control device has one multi-function thumb push switch, allowing cursor movement, rate of movement and object selection to be performed from this one thumb switch and an index finger slide switch for mode control, whereas these switches are located in the natural resting positions of thumb and finger when the device is held in either the left or the right hand. The remote control device is equipped with a display window for displaying device status, transmitting means, working in conjunction with a general purpose computer with a video monitor for controlling and selecting program data, or working in conjunction with a television controlling and selecting television programming choices. The Display Configuration providing a choice selection screen format, using a three dimensional array of four sided boxes with alphanumeric characters identifying the box, enabling natural and easy selection of choices numbering in thousands.

16 Claims, 9 Drawing Sheets

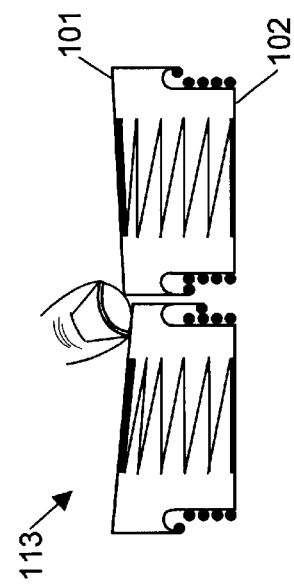
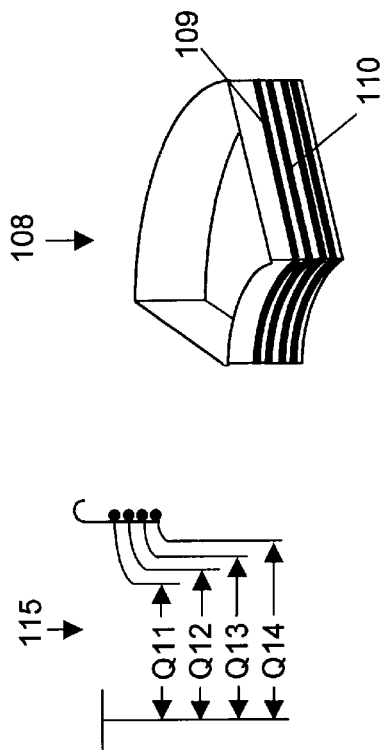
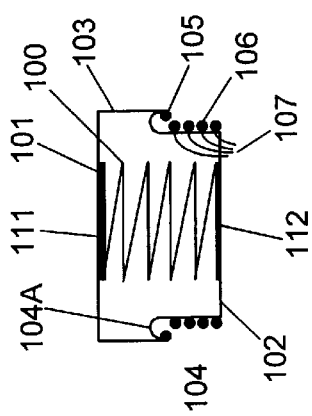
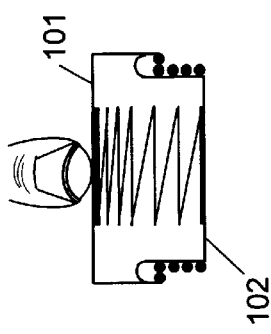
Figure 3A
Figure 3B
Figure 3C

MAN MACHINE INTERFACE VIA DISPLAY PERIPHERAL

CROSS REFERENCE

This application is continuation in part of the application titled "Remote Control Device" by Tara Chand Singhal, serial number 08/433,992, filed on May 04, 1995, now pending before the Patent and Trademark Office.

BACKGROUND

In computer applications, using a mouse or arrow keys on a keyboard, users first position a cursor on a display peripheral, select an object identified by cursor, and then sequentially traverse many layers of decision making screens or lists to be able to make a final selection. In applications such as TV control, users use a remote control device with a key pad with many push button switches, to select one of many TV/Cable program channel options as well as make other choices for control. In operation of display peripheral based devices such as a computer or television, a user usually has many choices to make a final selection therefrom.

With the arrival of multi-media computer technology, and other related technologies in pipeline such as video servers providing programming on demand and concurrent prolification of software titles, users would be and are faced with making selections from a much larger array of choices before them. Such choice information has to be well presented, readily understood, and means available to the users for them to make intelligent and rapid choice decisions.

Devices for control/select, to allow rapid and easy selection, are inadequate. Computer mouse based pointing and selecting devices, TV remote controls, icons, windows/layers, in how they function, do not offer any real help in rapid selection of choices.

Thus there is a need for an improvement in man machine interface as it relates to the selection of choices on computers, Televisions and other such devices, thereby making selections rapid, easy, and natural, from a very large list of choices numbering in hundreds and in thousands.

SUMMARY

This invention relates to improvements in Man Machine Interface via Display Peripheral. The invention provides: an improved means of man machine interface in operating and controlling devices such as computer, television, electronic games and appliances; an improved means to effect the movement of a cursor on a display peripheral; an improved means to select an object identified by the cursor position; an improved means to display selection choices on a display peripheral; and an improved means to make a final selection from a large array of choices.

The invention has an embodiment called Control Device providing an improved means to effect the movement of the cursor, an improved means to select an object identified by the cursor, and improved control means. The invention has an another embodiment called Display Configuration, which provides an improved means to display selection data and improved means to make a final selection from a large array of choices. These embodiments of the invention are intended to work and be utilized in conjunction with each other and are an embodiment called Control Mechanism. They can also work and be utilized independently of each other as Control Device and Display Configuration.

The control device has a multi-function thumb switch (hereinafter referred to as multi-function switch). Appearance wise the multi-function switch looks like a slightly bigger than thumb size circle or oval that is contoured to the contours of a thumb. The multi-function switch performs three separate functions. The switch incorporates: a center push switch (hereinafter referred to as center switch) activated by applying thumb pressure in the center of the multi-function switch; an annular switch, surrounding the center switch, activated by applying thumb pressure on any part of the annular switch; and a cursor movement rate, activated by the degree of thumb pressure to any part of the annular switch.

Thumb pressure in the center of the multi-function switch activates the center switch and may be used to make the selection. Thumb pressure on the annular switch, is used to make a cursor traverse the display peripheral screen. The duration of thumb pressure controls the distance of movement whereas the degree of thumb pressure controls the rate of motion of the cursor on a coarse to fine scale. The annular switch incorporates a thumb pressure detector which is used to control the rate of cursor movement, such that with this one multi-function switch, a user without physically separating the thumb from the switch can traverse to any part of the screen very rapidly, precisely and at the same time make a selection. Such a control device can be incorporated in laptop type computers and made an integral part of lap top computer body.

Preferably, the control device as described above is part of a remote control device, which is an elongated hand held body shape. In the Remote Control Device, the multi-function switch is placed in the natural position of the thumb and it also has another switch placed in the natural position of the index finger (hereinafter called index finger switch). In this remote control device, the index finger switch is positioned on the opposite side of the thumb switch, to naturally align with the index finger position when the remote control device is held in the hand. This switch, which is operated by sliding the index finger in the forward or backward direction is also used in making selections or for making mode changes. The remote control device works for left hand, right hand and different size hands equally well.

The Remote Control Device is preferably equipped with a display window, positioned next to and forward of the multifunction switch. The display window shows the status or the mode of the Remote Control Device, as the index finger switch position can be used to place the Remote Control Device in different control modes. Some examples of these control modes are: program control, volume Control, aircraft surface control mode etc.

The remote control device's switch activation signals from the center switch, the annular switch and the index finger switch, are transmitted via a wire or preferably wireless/infra-red interface mechanism to a program logic in the equipment to be controlled and selected. The program logic, in response to this transmission, manages the logic to move and maintain the cursor position. The program logic outputs the final selection as a command to the computer operating system or to the TV/Cable tuner.

Preferably, the control device or the remote control device is used in conjunction with a special Display Configuration (hereinafter referred to as Display Configuration) that organizes and arranges selection choices for ease of selection. The Display Configuration displays the choices in a three dimensional grid. The choices are arranged in an x-y axes rectangular grid of box like figures. Each box can have a stack of boxes behind it in a Z axis. Each choice is represented by a box, with the choice identified in alphanumeric characters inside the box.

The selection choices may be presented to the user on the screen structured such that the main choices are arrayed along the first vertical column of boxes and the sub-choices are spread along the horizontal row of boxes. Additional screen may be used for each of the sub-choices. This arrangement of selection choices allows as few as two screens to display choices in thousands. The program logic contains a user alterable data file which defines the choices.

On the Display Configuration, the cursor location is indicated by the boundary of the box being highlighted. The cursor movement is restricted to being on one of the boxes. For the boxes that are hidden, the visible part of the box boundary is highlighted.

In the Display Configuration, the boxes in the left column may be colored differently than the boxes in the rows. The boxes may be dressed up with a colored border and a different color inside. Each box may have a number on corners of the box. These numbers may be used to show the unique selection number of the box and the session selection number, in case more than one selection is made at one time to be used in a sequence. There may also be cross hashed or shaded smaller boxes in the left lower corner, that are used to indicate status of the selections.

An area of the screen may be set aside for showing the selection history. It may be set aside on the right of the screen, in the form of a long vertical box. It may be used to store and display the selections as they are being made on the screens. An additional vertical box may be similarly placed and may be used to show and set the priority of the channels. Priority in this context refers to what other channels can interrupt the currently active channel. For example Internet mail message, or News Channel can interrupt movie channel.

Inside the boxes, in letters, is written the topic of the box. Combination of stylish and colored letters are preferred over picture icons. When a final selection is made, it is activated by the logic issuing operating system command in a computer or commanding the tuner or video server in a TV/cable box. The information from that program source is then routed to the video screen.

Preferred embodiments of this invention in TV control, Computer control, Electronic Game control and Appliance control, are described as follows:

In remote control of Television, the Display Configuration would be used to display large number of channels such as hundred plus channels being made available via Digital satellite technology as well as many choices within a channel such as pay per view movies and programs. The Display Configuration would categorize, identify and visually arrange the channels by their topic, such as news, movie, sports etc. The remote control device display window would indicate control mode such as channel mode in this case, based on the position of index finger switch. With the annular switch of the multi-function thumb switch a user would rapidly move the cursor to one of those choices of program channels because the cursor movement is restricted to hop from one choice to another choice and the cursor movement is rate sensitive based on degree of thumb pressure. The selected choice is clearly identified by the choice box border that has been highlighted. Then the same multi-function thumb switch, without having moved the thumb away from it and using its center switch and without doing anything, that particular selected channel would be tuned.

A user could slide the index finger switch to other positions, select other modes for control such as volume and picture control mode, and then the multi-function thumb switch can be used for volume control and picture control. A user could slide the index finger switch to clock setting control, and use the thumb switch to change the clock setting, the center switch is used to finalize the selection and return to previous or the newly selected mode.

These features of Remote Control Device and Display Configuration can also be used to perform other control functions, such as programming the TV's functions, and power turn on/off.

In this TV embodiment the benefits over prior art are: allowing rapid transition between channels, without consciously pressing a channel number or sequencing channels as in prior art TV controls; selection of program channels not by their channel number as in prior art but by their name and content; simpler viewing and rapid selection of choices; and a simplified and natural hand held control.

In computer type embodiments the control device with its multi-function thumb switch will become an integral part of the lap top base. In this embodiment, a user using his thumb would use the multi-function switch to effect a precise and rapid movement of cursor and select the identified object, without having have to lift his thumb. This control device would preferably be used in conjunction with Display Configuration, which can organize, categorize and visually present a large number of choices on one screen for rapid selection and control of laptop functions and operating modes.

In desk top computer embodiments, either the control device or the remote control device can be used, which can be used in conjunction with the Display Configuration. With the Remote Control device, a user would employ a casual and relaxed attitude as the remote control device is not desk and therefore position bound by where it is placed on the desk. It is conveniently held in user's left or right hand, as convenient to him, and thus free to be held and moved around.

The benefits of computer control embodiment over prior art are: ease of use as the device is not desk bound, while being used or not used, therefore can be kept and held in more user convenient positions and postures; the method of operation is different, as there is no roller ball or surface over which the thumb or finger is slided, but pressure sensitive digital contacts enabling precise and rapid rate sensitive cursor movement, are utilized; one multi-function switch operated by thumb is used for both the cursor movement and the selection; and Display Configuration would categorize and visually display a large number of choices on very few screens, making simpler viewing and rapid selection of the final choice.

In electronic game control embodiment, the Remote Control viewing and rapid selection of the final choice.

In electronic game control embodiment, the Remote Control Device would be used for rapid control of game functions, as it allows multiple functions to be conveniently performed without shifting of hand and fingers and thumbs from switch to switch.

The prior art use of Joystick type control for the same purpose necessitated that the Joystick be positioned near a player's waist level and user's elbow be bent to properly use it. No such restriction exists in use of Remote control device, as its features would permit it to be held in any position relative to the body.

In embodiment such as appliance control, since the Remote Control Device is equipped with a display window, it can display appliance status on its display. It can be used to control the appliances from a distance away from them. Examples of the appliances that can be controlled are drapery open/close control, home security system control etc.

DRAWINGS

These and other features, aspects and advantages of the present invention will become better understood with regard to the following description, appended claims, and accompanying figures, where;

FIG. 1 shows a perspective view of one version of control device in a laptop computer application; a perspective view of one version of remote control device, in remote control of a computer application; a perspective view of one version of remote control device, in remote control of a television application; and a perspective view of one version of remote control device, in remote control of electronic games or appliances application;

FIG. 3A is a vertical cross-sectional view of one quadrant of multi-function thumb switch and a perspective view of vertical walls showing electrical connections;

FIG. 3B is a vertical cross-sectional view of one quadrant, showing thumb pressure applied in the center of quadrant, and also when the thumb pressure is on the extremity of quadrant;

FIG. 3C is a vertical cross-sectional view showing two quadrants side by side, with thumb pressure applied evenly in the middle of the two quadrants and with thumb pressure applied unevenly in the middle of the two quadrants;

DESCRIPTION

Figure 1:
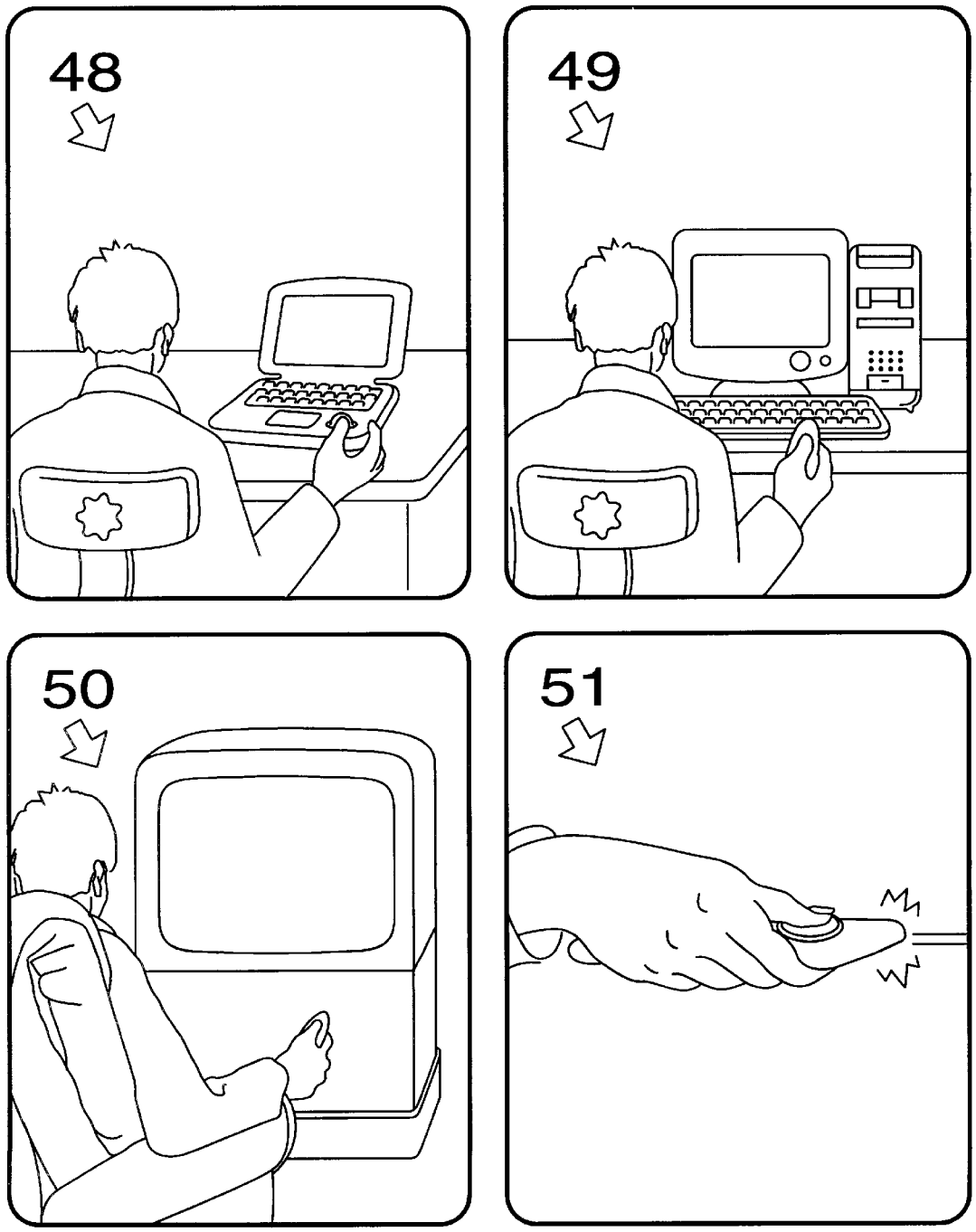

FIG. 1 illustrate the different uses of this invention. It shows the Control Device use in a laptop computer application for cursor control and object selection (48). It shows Remote Control Device, in remote control of a computer, including cursor control and object selection (49). It shows Remote Control Device, in combination with Display Configuration in remote control of a television and be able to perform television control and program selection (50). It shows Remote Control Device, in remote control of electronic games or appliances (51). The Display Configuration embodiment can be used in used in all of these different uses by itself or in combination with the Remote Control Device or the Control Device and is called a Control Mechanism.

Figure 2A:
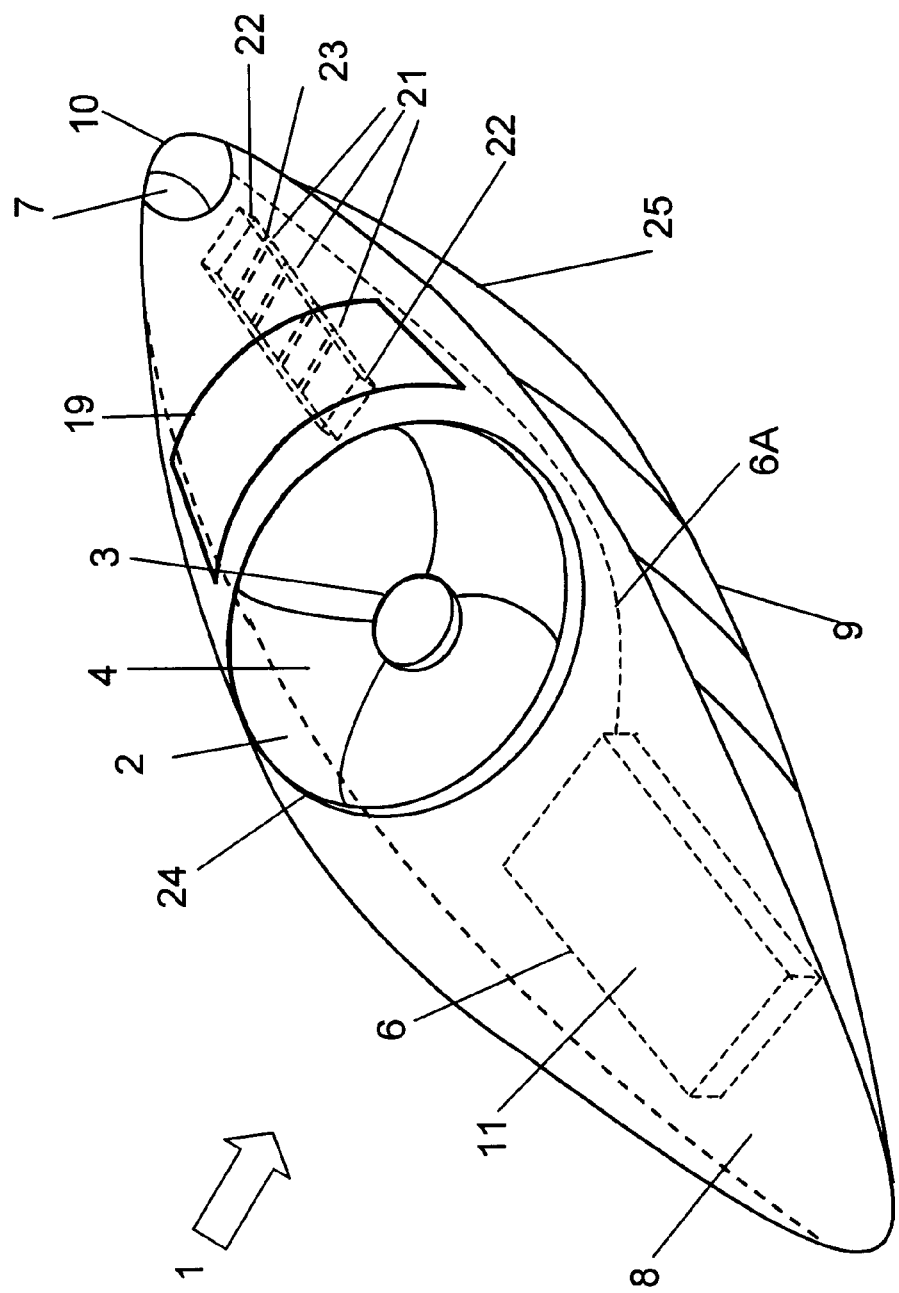
FIG. 2A is a perspective view showing one version of the Remote Control Device.
Figure 2B:
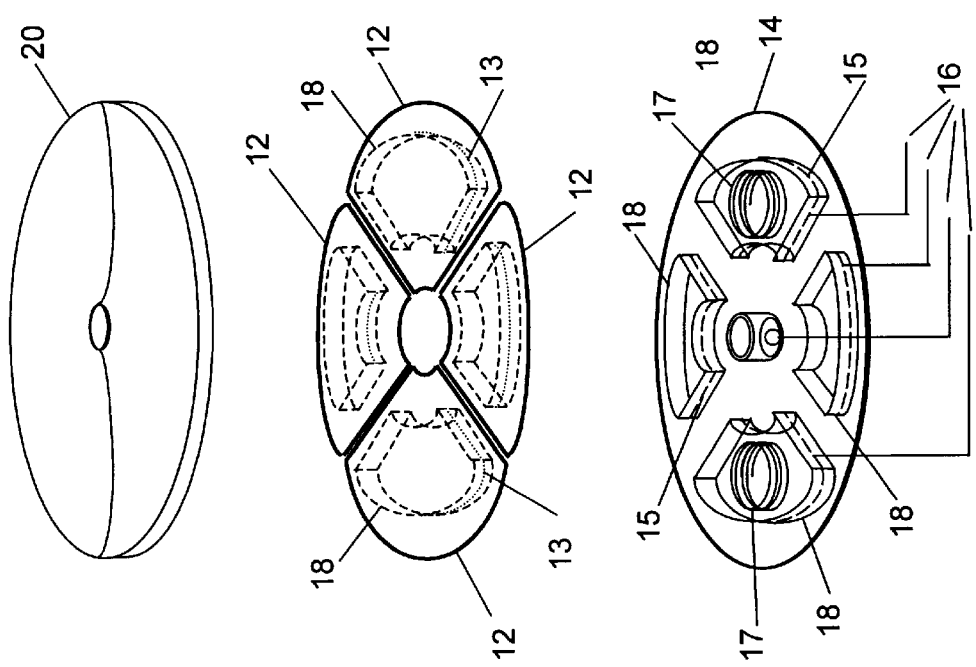
FIG. 2B is a perspective view showing one version of the Control Device.

With reference to FIGS. 2A and 2B, a remote control device (1) has a multi-function thumb switch (2). The size of the multi-function switch is such that it enables a human thumb to activate by pushing one or other of the switch's functions without physically separating the thumb from the multi-function switch.

The remote control device has preferably a substantially elongated and substantially rounded shape body sized to be held in a human hand. The body has a top side (8), wherein a portion of the top side (24) has a substantially flat area sized to accommodate the multi-function thumb switch, a bottom side (9), wherein, a portion of the bottom side (25) has a substantially flat area sized to accommodate the index finger slide switch.

The multi-function thumb switch when used by itself in laptop computer and similar applications is identifed as a Control Device embodiment. The multi-function thumb switch is described in more detail herein later with the help of FIGS. 3A, 3B and 3C.

The remote control device has a body within which are housed an electronic means (6) and a transmitting means (7). The electronic means converts the thumb and index finger switch activations to electronic signals and then sends them over connection (6A) to the transmitting means. The transmitting means then transmits the signals out of the remote control body.

The body also has a front side (10) sized to accommodate the transmitting means and an inside of the body (11), sized to accommodate the electronic means.

The multi-function thumb switch is made of a center push switch (3) surrounded by an annular switch (4). The annular switch is preferably made of four quadrants (12) of switch plate arranged in circular arrangement with their radial sides in close proximity to each other. Each quadrant has electrical contacts (13). There is a base plate (14) positioned directly below the quadrants with electrical contacts (15), corresponding to the quadrants' electrical contacts. Electrical leads (16) from the base plate connect the electrical contacts to an electronic means used to control switch activation to cursor commands. Each of the quadrants is equipped with a spring mechanism (17) resisting thumb pressure, while allowing the electrical contacts between quadrants and the base plate to be made.

In a version of the thumb switch, the underside of the each quadrant and the upside of the base plate have meshing and close fitting boundary walls, which are situated perpendicular to the quadrant and the base plate surface (18). These walls have a series of spaced apart metallic contacts that are made when the thumb pressure is applied. The thumb pressure is resisted by the spring mechanism between the quadrant and the base plate. Each pair of electrical contact between the quadrant and the base plate that is made and the duration of such contact is indicative of one of fast (coarse) to slow (fine) rate of movement of a cursor The electrical leads from these electrical contacts are connected to the electronic means.

The electrical contacts made between the quadrants and the base plate indicate radial direction of thumb pressure and amount of thumb pressure. The four quadrants indicate one of four main axial directions of north, south, east and west, whereas, pressing two adjacent quadrants at the same time indicates other directions. Multiple contacts between the base plate and the quadrant sense the thumb pressure. Therefore the annular switch activates electrical connections based on axial direction and degree of thumb push force on the annular switch.

Preferably, an annular switch cover covers/hides the four quadrants (20).

Preferably, the index finger switch, has ribbed surface (21), front and back finger stops (22), enabling the slide switch to be operated by sliding the index finger forward or backward. The index finger switch is operated by sliding it into one of a plurality of the switch positions (23). The index finger switch is described in more detail herein later with the help of FIGS. 4A, 4B and 4C.

Preferably, an electronic display window on the remote control device's body, driven and controlled by the electronic means, displays the switch activation and the remote control device status (19). The display window is positioned near the multi-function switch and ahead of it.

LED or LCD type display window, which shows alphanumeric characters is used. Such displays are common in prior art. The display is being controlled by the logic circuit. The purpose of this display window is to show the state of the switch activations from thumb switch and the mode in which such activations exist represented by the index finger switch. For example, a mode could be cursor movement control, a clock setting control, simulated aircraft surface control etc.

Electronic means within the Remote Control Device is a logic circuit, that is common in prior art, where signals are input and based on the specified logic designed in the logic circuit, output signals are produced. The electronic means also incorporate memory. No new art is disclosed or claimed in this respect.

The transmitting means is what is provided in the prior art. For example home audio/video systems use remote controls and computers use mouse pointing devices, both of which employ either infrared type or a wire connections as transmitting means. No new art is presented or claimed in this respect.

The hand with the help of palm and its fingers grips the Remote control device body, while the thumb is loosely held against the thumb switch and finger is loosely held against the sliding switch. The limiting structure is the body of the remote control device. Since the motion of thumb switch is push, and finger switch is slide, it is possible for the hand to distinguish and exercise independent control on the switch that is being activated.

When the thumb switch is used by itself on its own in a lap top computer or similar device application, the limiting structure is the lap top body or the device body itself.

In the current art, the input signals are the thumb switch activations from the four quadrants and center switch and index finger switch. The signals that are output are to the transmitting means and the display. Input signals are switch contact on/off digital signals. Based on the description of the switches as provided here, there will be twenty two on/off signals from the thumb and index finger switches. These are converted to output signals for the display to indicate the mode, depending on one of the finger switch positions and on/off states to be sent by transmitting means. The on/off output signals are coded to identify which switch activation they correspond to.

Refer to FIG. 3A. It shows a vertical cross sectional view of one quadrant consisting of: spring (100), thumb plate (101), base plate (102), vertical walls on the thumb plate (103), vertical walls on the base plate (104), contact making bar (105) on the wall of thumb plate, multiple electrical contacts (106) on the vertical wall of the base plate. Electrical wire connections (107) from multiple electrical contacts (106).

The spring mechanism is a spring commonly used in prior art, such as a coiled spring or similar purpose means. It is positioned between the underside of the thumb plate and the upside of the base plate. It resists the thumb pressure on the quadrant, allowing the thumb plate to move up and down in relation to the base plate.

Multiple electrical contacts (106) are positioned in the vertical walls (104) on the base plate and an electrical contact closing bar (105) on the vertical walls (103) of the thumb plate. This electrical contact closing bar (105) and the multiple electrical contacts (106) run all around the four sides of the quadrant. Refer to a perspective view (108) of vertical walls on the base plate. There are plurality levels of electrical contacts, called level 1 (109), level 2 (110) and so on. About four levels are desirable, although they could be many more giving a finer/precise rate of cursor movement.

The wall (103) and wall (104) move parallel to each other, as the quadrant is pressed and in the process the contact closing bar (105) and the electrical contacts (106) rub against each other, thereby the contact closing bar making electrical contact with one of the levels depending upon the thumb pressure on the quadrant.

The multiple electrical contacts (106) are connected to wires that go to the logic circuit. The contact closing bar and the thumb plate are of metallic base which makes contact with the top end of the spring (111), the other end of the spring is making contact with the base plate, which has the electrical wire (112) that represent the contact closing bar. Electrical wires to the logic circuit for four levels of connections represented by Q11, Q12, Q13 and Q14 are shown (115)

The top end of the wall (104) is curved outward (104a), allowing the thumb plate with the help of its contact closing bar to remain in position and engaged with the base plate, when the thumb pressure is released.

Refer to FIG. 3B. If the thumb pressure was applied on the extremity areas of thumb plate, the spring would allow only that part of thumb plate to move down and make electrical contact on that side, in the process tilting the thumb plate slightly upward on the opposite end of this plate. The electrical contact between the contact closing bar and one of the multiple contacts is made, no matter which extremity edge of the thumb plate is pushed, since the same multiple contacts are on all four sides walls as shown in the perspective view (108).

Refer to FIG. 3C. When the thumb pressure is applied to two quadrants that are side by side, and the thumb pressure is even between both the quadrants, then, same level electrical contacts on both quadrants are made. However if the thumb pressure is uneven, then different levels of contacts on the two quadrants are made as illustrated (113).

These contact wires from the different levels on the four quadrants are connected as input to the logic circuit. Let us say the contact wire signals are named Q11, Q12, Q13, Q14 from Quadrant 1 (top quadrant), Q21, Q22, Q23, Q24, Q31, Q32, Q33, Q34, Q41, Q424, Q43, Q44, from the other three quadrants. The outputs of the logic circuit are X-Y movement commands for the curser. The X-Y movement of cursor is related to the time duration these Quadrant contacts are made as follows:

Q11 being on corresponds to X direction movement at rate of movement equal to 0.5 inches/sec.(0.5 is illustrative) Q12 being on corresponds to X direction movement at rate of movement equal to 1.0 inches/sec. (1.0 is illustrative) Q13 being on corresponds to X direction movement at rate of movement equal to 2.0 inches/sec.(2.0 is illustrative) Q14 being on corresponds to X direction movement at rate of movement equal to 4.0 inches/sec.(4.0 is illustrative)

Q21, Q22, Q23, or Q24 being on corresponds to Y direction movement at rate of movement equal to 0.5, 1.0, 2.0 or 4.0 inches/sec.

Q31, Q32, Q33, or Q34 being on corresponds to -X direction movement at rate of movement equal to 0.5, 1.0, 2.0 or 4.0 inches/sec.

Q41, Q42, Q43, or Q44 being on corresponds to -Y direction movement at rate of movement equal to 0.5, 1.0, 2.0 or 4.0 inches/sec.

Q11, Q21 both being on corresponds to X direction movement at 0.5 inches/sec and at the same time Y direction movement at 0.5 inches/sec.

Q12, Q21 both being on corresponds to X direction movement at 1.0 inches/sec and at the same time Y direction movement at 0.5 inches/sec.

Q13, Q21 both being on corresponds to X direction movement at 2.0 inches/sec and at the same time Y direction movement at 0.5 inches/sec.

Q14, Q21 both being on corresponds to X direction movement at 4.0 inches/sec and at the same time Y direction movement at 0.5 inches/sec.

Q14, Q22 both being on corresponds to X direction movement at 4.0 inches/sec and at the same time Y direction movement at 1.0 inches/sec.

. . . and so on, allowing control of cursor movement in the X-Y plane on the display peripheral. For example, If the quadrant Q1 is pressed for one tenth of second with enough pressure to engage level 1 contact, the cursor would move 0.05 inches in X direction. If the quadrant 2 is pressed for 1 second engaging level 2 contact, the cursor would move 1 inch in Y direction. If quadrants 1 and 2 are both pressed at the same time, the cursor would simultaneously move in X-Y direction. If the pressure on quadrants 1 and 2 is uneven, then the cursor would move in X and Y direction at rates depending on the level of contacts made in quadrants 1 and 2.

Figure 4C:
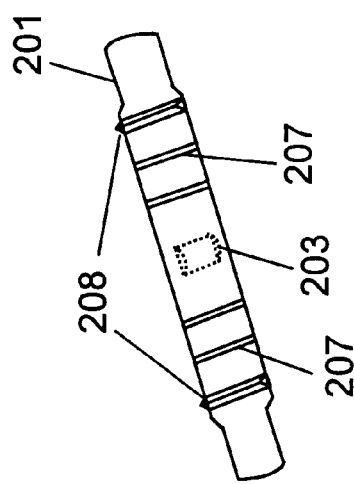
FIG. 4C is a perspective view of sliding member of index finger switch.
Figure 4A:
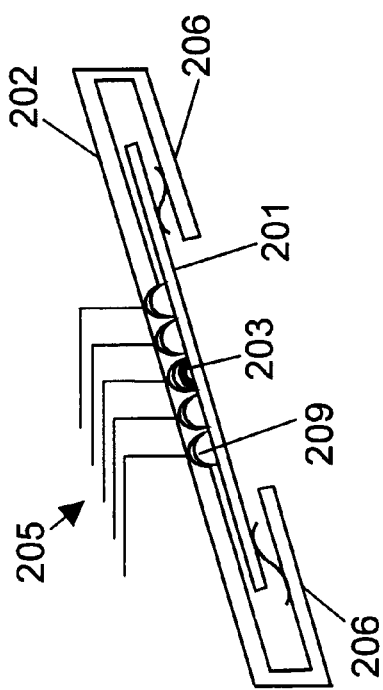
FIG. 4A is a side view of index finger switch.
Figure 4B:
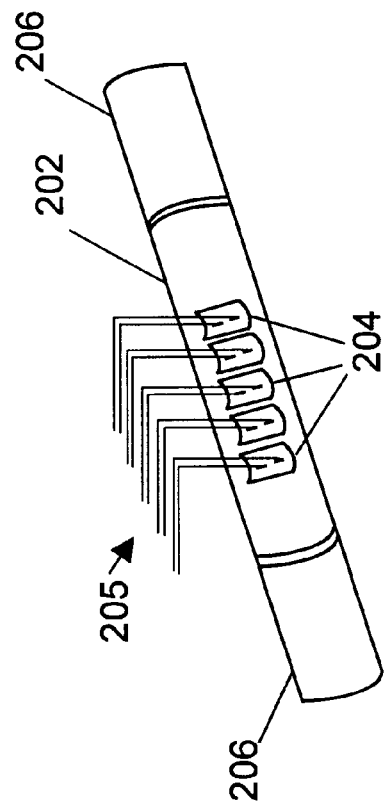
FIG. 4B is a perspective view of fixed member of index finger switch.

With reference to FIGS. 4A, 4B, and 4C, the index finger switch is a nearly horizontal movement switch activated by sliding motion of a curved index finger. The switch incorporates a sliding member (201) and a fixed member (202). The sliding member has a metallic bar (203) in the middle on one of its side, and the fixed member has plurality of spaced apart dual metallic contact bars (204). The dual bars are electrically connected when the metallic bar of the sliding member is brought on them. Five metallic dual bars are shown in the figure. Each of these are connected to electrical wires (205) that are input to the logic circuit, enabling logic circuit to know which one of the five the sliding member metallic bar is positioned on.

The sliding switch positions corresponding to the five dual contacts are indented (209) enabling the finger to feel when a contact is being made.

The sliding member is firmly held against the fixed member and allowed to slide against the fixed member with the help of housings at both ends of the switch (206). The housing has the sliding member ends enclosed in the fixed member ends.

The side of the sliding member that comes in contact with the index finger has protruding bars (207) and stops bars (208), allowing the finger to get friction grip on the sliding member and to mark the two ends of the sliding member between which the index finger can be positioned.

Figure 5A:
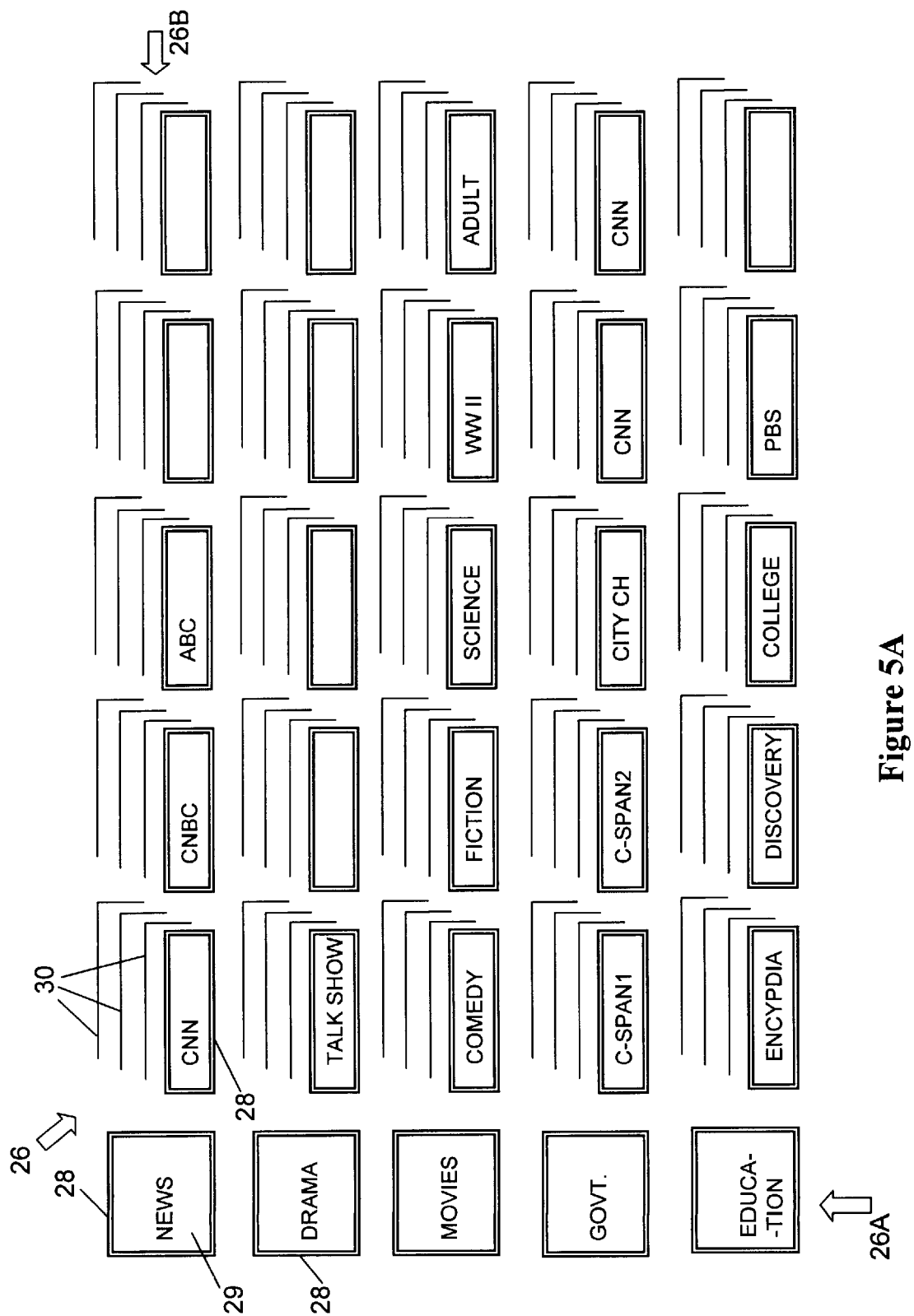
FIG. 5A is a version of Display Configuration showing display of selection choices and sub-choices.
Figure 5B:
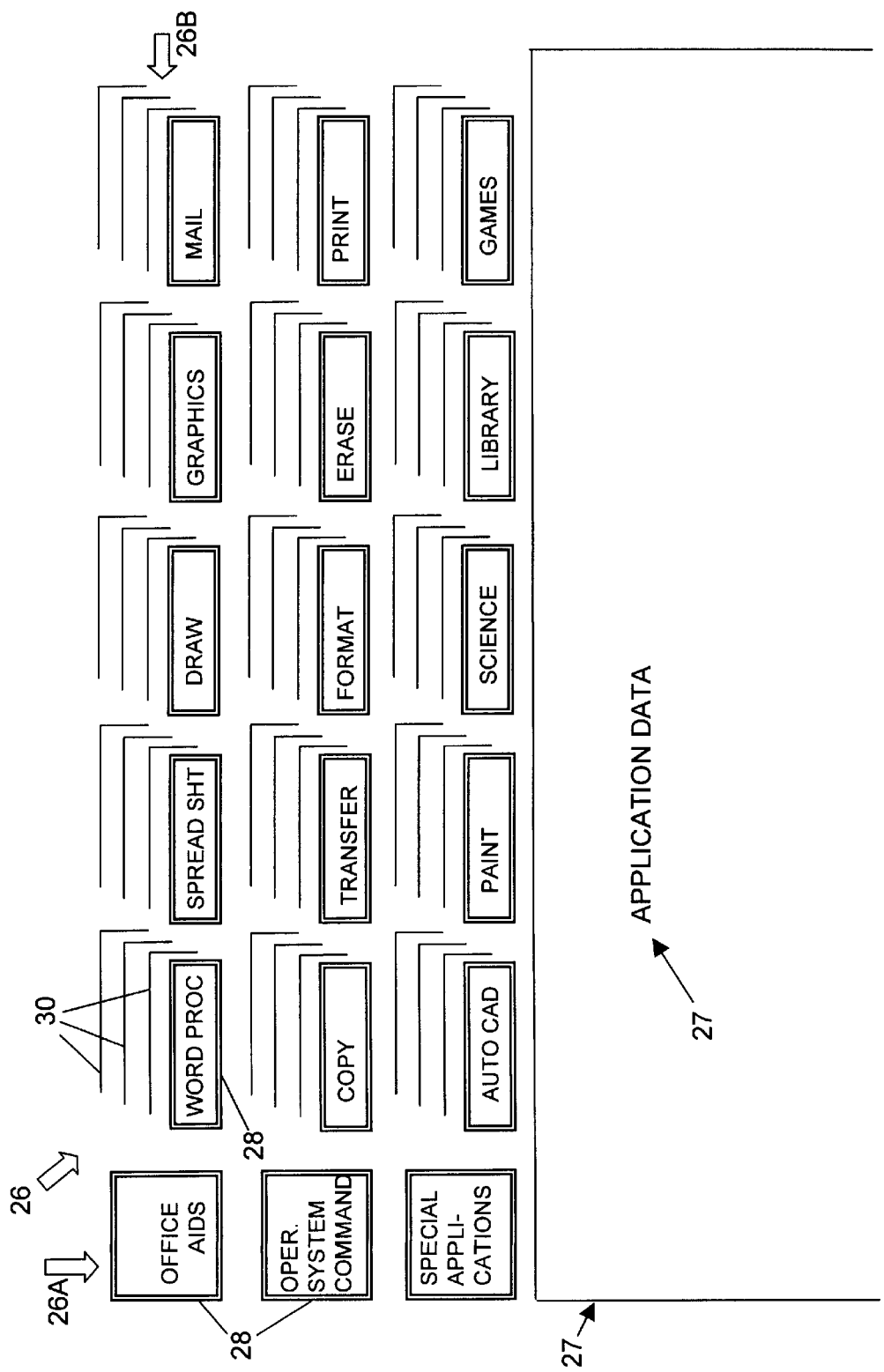
FIG. 5B is a version of Display Configuration co-existing with application data on the same screen.

FIG. 5A and 5B show, for video screen based devices, a selection data display format called Display Configuration. The format shows a set of choices, and for each choice a set of sub-choices, from which a selection of one or more is desired (26). This format may be co-used on a screen on the upper or the lower part of the screen along with the display of application data on the remainder of the screen by overlaying it on the video screen along with the application data (27). It may also be used by itself to cover the entire video screen (26). In this format, the choice and sub-choice are represented by a closed figure with borders (28), while the space inside the figure identifies the choice (29). The sub-choice may also be represented by a partially hidden figure behind the closed figure in the front (30). The choice figures are displayed in a column (26a) and the sub-choice figures are displayed in rows (26b).

Figure 6:
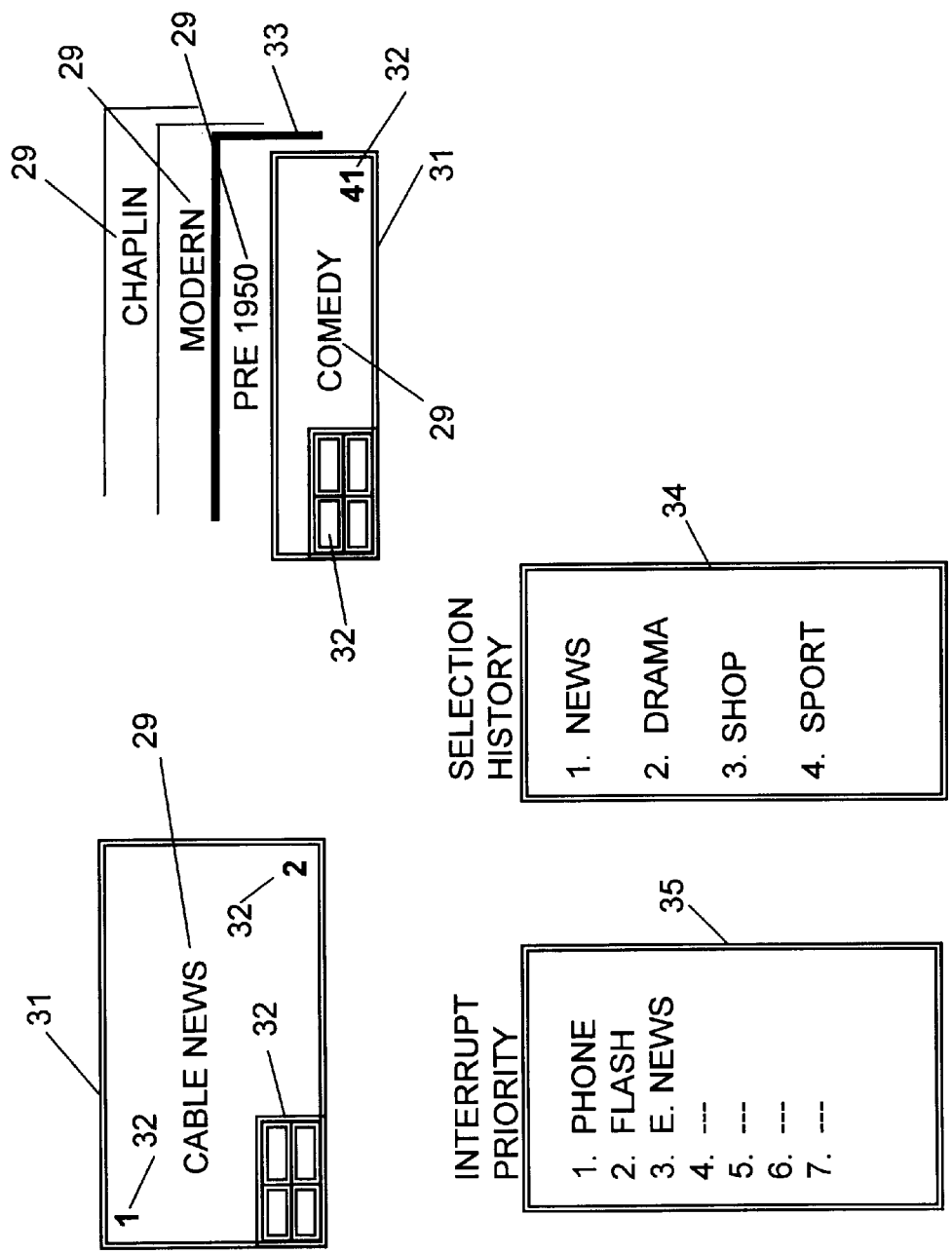
FIG. 6 is a version of box figures for a choice/sub-choice, selection history status and channel priority status.

FIG. 6 shows the details of closed figures. The format for each closed figure may further include the closed figure having four sides (31) and the four sided figure having smaller closed figures and or numbers defining choice selection history and selection sequence within the closed figure (32). In this format, the cursor may rest on one of the choices and may further include a choice selection highlighted by highlighting in color and or thickness atleast two sides of the closed figure (33).

The format may also include one or more additional closed figures. The content of one may be used to record the selection history of the choices (34). The content of another may be used to identify the events in the form of priority of channels for interrupt (35).

Figure 7:
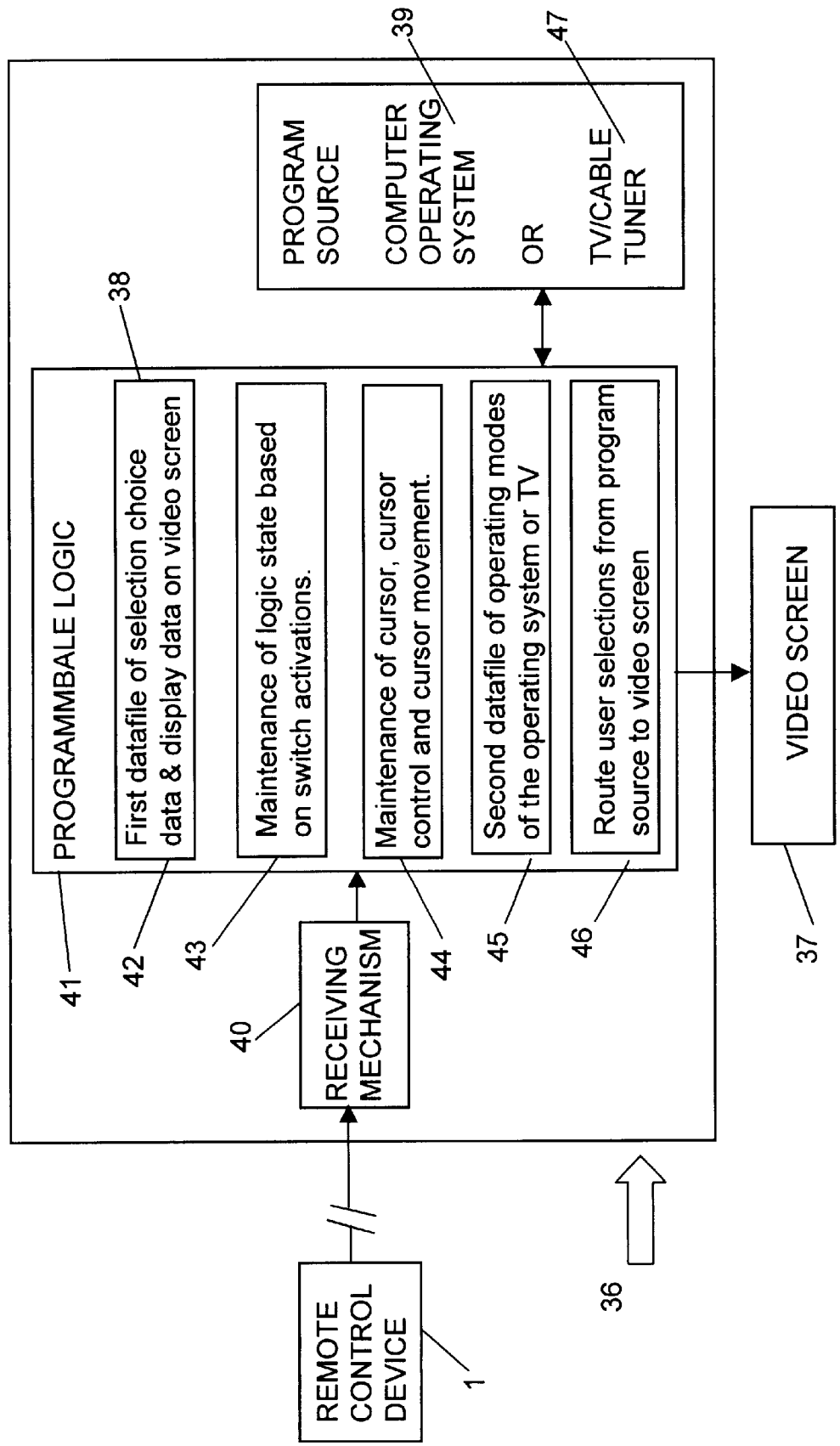
FIG. 7 is a version of functional block diagram showing the Control Mechanism.

With reference to FIG. 7, it shows the remote control device is part of a Control Mechanism, including a device to be controlled. The controlled device (36) has a video screen (37) enabling the visual display of control and selection choices, a digital general purpose computer (38), a computer operating system for operating modes to be controlled (39), and a receiving mechanism (40). In the remote control device, the transmitting means transmit the signals out of the remote control body. The receiving mechanism of the controlled device (40) receives the signals.

A programmable logic (41), within the computer, receives the signals via the receiving mechanism, controls the display of selection choices on the video screen and interfaces with the computer operating system to affect its operating modes.

The programmable logic includes: a first datafile containing content of selection choice data and display of this data on video screen (42); maintenance of logic state based on sequence of the switch activations (43); maintenance and control of cursor movement based on the annular switch activations (44); a second data file (45) containing information on operating modes of the operating system.

The programmable logic enables the display of selection screens, enables selection of a choice from the first data file, enables the operating mode identified in the second data file for display of the selected operating mode on to the video screen (46).

First datafile content (42) and its display format consists of a set of choices, and for each choice a set of sub-choices, from which a selection of one or more is desired.

In the Control Mechanism embodiment, the Remote Control Device using its annular switch is used to issue the cursor movement and rate of movement commands. The center switch activates the cursor identified selection. The index finger switch is used for escape forward, backward command and other mode commands.

In the Control Mechanism, the device to be controlled could be television set (47). The television preferably has means to externally input a datafile containing current and future program selection choices via cable/TV top set.

Although the present invention has been described in considerable detail with regard to the preferred version thereof, other versions are possible. Therefore, the appended claims should not be limited to the description of the preferred versions contained herein.

What is claimed is:

1. A remote control device adapted for use by a human to control and select from a screen, the screen including a plurality of choices and a cursor, the remote control device comprising:

a body adapted to be held by the human hand, the body having a top side and a bottom side;

a thumb switch positioned on the top side of the body, the thumb switch being adapted for activation by a human thumb, the thumb switch being adapted to perform multiple functions; wherein the thumb switch includes a center switch and an annular switch which surrounds the center switch, the annular switch being adapted to operate independently from the center switch; wherein the annular switch is adapted to effect movement of the cursor between the plurality of choices and the center switch is adapted to effect selection of one of the choices identified by the cursor;

electronic means adapted to generate a signal upon activation of one of the switches; and transmitting means for transmitting the signal from the electronic means.

2. The remote control device of claim 1, wherein the annular switch including four individual quadrant switches.

3. The device of claim 2 wherein at least one of the quadrant switches includes a thumb base plate having a plurality of spaced apart electrical contacts and a thumb switch plate which is adapted to move relative to the thumb base plate, wherein the thumb switch plate selectively and independently contacts each of the electrical contacts upon sufficient movement of the thumb switch plate relative to the thumb base plate, wherein the electrical contacts are fixed relative to the thumb base plate.

4. The remote control device of claim 1 further comprising a finger switch positioned on the bottom side of the body, the finger switch being adapted to be activated by a human finger.

5. The device of claim 4 wherein the finger switch is adapted to perform multiple functions and the finger switch includes a slidable, finger switch plate which is adapted to be moved by the human finger relative to a finger base plate, the finger base plate including a plurality of electrical contacts, wherein the electrical contacts are fixed relative to the body; wherein movement of the finger switch plate relative to the finger base plate causes the finger switch plate to selectively interact with the electrical contacts on the finger base plate.

6. The device of claim 2 wherein the electronic means includes logic converting means for converting movement of individual quadrant switches to movement of a cursor on a display peripheral, wherein the distance of movement of the cursor varies according to the degree of thumb pressure on the quadrant switch and duration of contact.

7. The device of claim 1 including an electronic display window secured to the body; wherein the electronic means generates status information which is displayed on the electronic display.

8. A control mechanism comprising:

a display peripheral including a set of choices and a cursor, each choice having a set of sub-choices from which a selection of one or more sub-choices is desired, the cursor being movable between the choices and the sub-choices; and a control device including a multiple function, thumb switch, the thumb switch including a center switch and an annular switch substantially surrounding the center switch, the annular switch being adapted to effect movement of the cursor between the plurality of choices and sub-choices and the center switch being adapted to effect selection of one of the choices and sub-choices identified by the cursor, wherein the annular switch is adapted to operate independently of the center switch.

9. The control mechanism of claim 8 including a programmable logic, the programmable logic comprising:

a first data file containing the selection choice data;

a first function means for maintenance of logic state based on sequence of the switch activations and a second function means for maintenance of a cursor's movement based on the annular switch activations;

a second data file containing operating modes of an operating system, wherein each choice data from the first data file has a corresponding operating mode in the second data file, whereby the programmable logic enabling the display of a selection screen populated with selection choice data from the first data file, enabling selection of a choice from the selection screen, enabling the corresponding operating mode identified in the second data file to be invoked.

10. The control mechanism of claim 8, wherein the sub-choices for one of the choices are represented by a Figure partially hidden by the sub-choices.

11. The control device of claim 8, wherein the degree of pressure on the annular switch controls the rate of cursor movement.

12. A control mechanism adapted to be used with a device which utilizes a computer, the control mechanism comprising:

a display peripheral for the computer, the display peripheral including a plurality of choices, at least one of the choices including a plurality of sub-choices, the display peripheral also including a cursor adapted to be moved between the choices and sub-choices; and a remote control device including: (i) a body adapted to be held by a human hand, the body having a top side and a bottom side; (ii) a multiple function thumb switch positioned proximate to the top side, the thumb switch being adapted to be activated by a human thumb to activate the multiple functions of the thumb switch without physically separating the thumb from the thumb switch; (iii) an index finger switch positioned on the bottom side, the finger switch being adapted to be operated by sliding motion of index finger; (iv) an electronic means secured to the body, the electronic means converting the thumb and index finger switch activations to a signal; and (v) transmitting means adapted to transmit the signal from the electronic means.

13. The control mechanism of claim 12 comprising:

a first data file containing the selection choice data;

a first function means for maintenance of logic state based on sequence of the switch activations and a second function means for maintenance of a cursor's movement based on the switch activations; and a second data file containing operating modes of an operating system, wherein each choice data from the first data file has a corresponding operating mode in the second data file, whereby the programmable logic enabling the display of a selection screen populated with selection choice data from the first data file, enabling selection of a choice from the selection screen, enabling the corresponding operating mode identified in the second data file to be invoked.

14. The control mechanism of claim 12, wherein the sub-choices of at least one by a figure which is partially hidden by the choice.

15. The control mechanism of claim 12, wherein the annular switch controls cursor rate and duration of movement among the choices and sub-choices, and the center switch identifies the selection and wherein the annular switch is adapted to operate independently of the center switch.

16. The device of claim 1 wherein the annular switch includes four individual quadrant switches, at least one of the quadrant switches including a thumb base plate having a plurality of spaced apart electrical contacts and a thumb switch plate which is adapted to move relative to the thumb base plate, wherein the thumb switch plate selectively and independently contacts each of the electrical contacts upon sufficient movement of the thumb switch plate relative to the thumb base plate.

* * * * *

(12) EX PARTE REEXAMINATION CERTIFICATE (6464th)
United States Patent
Singhal

(10) Number: US 6,069,614 C1
(45) Certificate Issued: Oct. 7, 2008

(54) MAN MACHINE INTERFACE VIA DISPLAY PERIPHERAL

(76) Inventor: Tara C Singhal, P.O. Box 5075, Torrance, CA (US) 90510

Reexamination Request:
No. 90/007,850, Dec. 16, 2005

Reexamination Certificate for:
Patent No.: 6,069,614
Issued: May 30, 2000
Appl. No.: 08/710,388
Filed: Sep. 16, 1996

Related U.S. Application Data

(63) Continuation-in-part of application No. 08/433,992, filed on May 4, 1995, now abandoned.

(51) Int. Cl.
*G06F 3/033* (2006.01)
*H04N 5/445* (2006.01)
*H01H 13/50* (2006.01)
*H01H 13/64* (2006.01)
*H01H 25/04* (2006.01)
*H01H 15/06* (2006.01)
*H01H 15/00* (2006.01)
*H01N 9/02* (2006.01)

(52) U.S. Cl. ............... 345/158; 340/825.72; 341/22; 345/159; 345/163; 348/734; 348/E5.103; 348/E5.105

(58) Field of Classification Search ............ 345/158, 345/159, 163; 340/825.72; 341/22; 348/734
See application file for complete search history.

(56) References Cited

U.S. PATENT DOCUMENTS

| 5,228,077 | A | * | 7/1993 | Darbee | 348/478 |
| 5,563,630 | A | * | 10/1996 | Tsakiris et al. | 345/160 |
| 5,594,509 | A | | 1/1997 | Florin et al. | |
| D379,816 | S | | 6/1997 | Laituri et al. | |
| 5,670,955 | A | * | 9/1997 | Thorne et al. | 341/22 |

OTHER PUBLICATIONS

Pictures of Philips Company Remote Controls, 11 pages.

\* cited by examiner

*Primary Examiner*—Ovidio Escalante

(57) ABSTRACT

An improved man machine interface for computer, television, electronic games and appliances, allowing rapid, easy and natural control and selections from a large array of choices. The remote control device has one multi-function thumb push switch, allowing cursor movement, rate of movement and object selection to be performed from this one thumb switch and an index finger slide switch for mode control, whereas these switches are located in the natural resting positions of thumb and finger when the device is held in either the left or the right hand. The remote control device is equipped with a display window for displaying device status, transmitting means, working in conjunction with a general purpose computer with a video monitor for controlling and selecting program data, or working in conjunction with a television controlling and selecting television programming choices. The Display Configuration providing a choice selection screen format, using a three dimensional array of four sided boxes with alphanumeric characters identifying the box, enabling natural and easy selection of choices numbering in thousands.

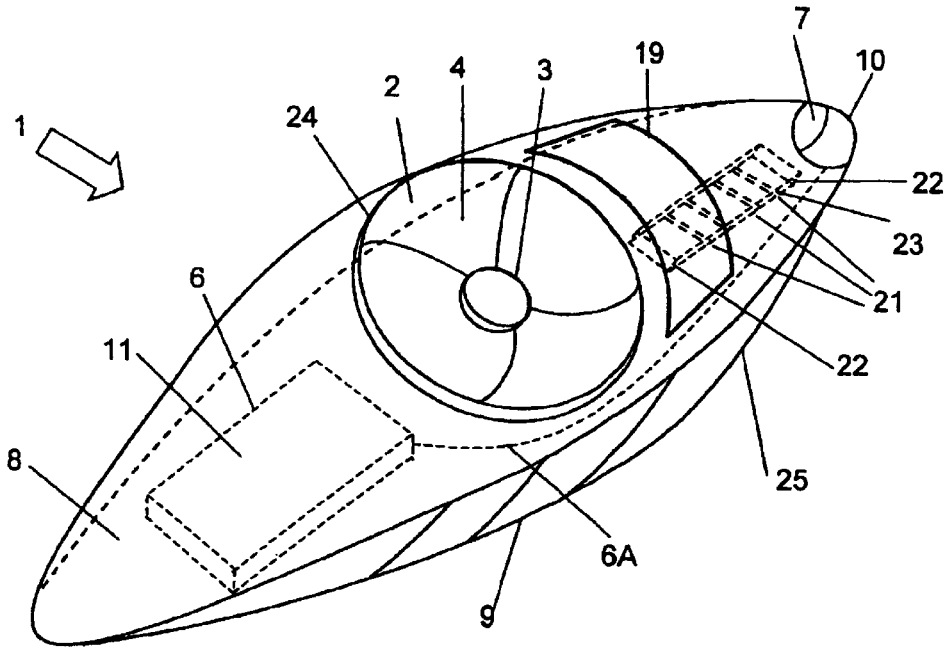

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12–15 is confirmed.

Claims 1 and 8 are determined to be patentable as amended.

Claims 2–7, 9–11 and 16, dependent on an amended claim, are determined to be patentable.

New claim 17 is added and determined to be patentable.

1. A remote control device adapted for use by a human to control and select from a screen, the screen including a plurality of choices and a cursor, the remote control device comprising:
   a body adapted to be held by the human hand, the body having a top side and a bottom side;
   a thumb switch positioned on the top side of the body, the thumb switch being adapted for activation by a human thumb, the thumb switch being adapted to perform multiple functions; wherein the thumb switch includes a center switch [and], an annular switch [which], *and a cover plate, the annular switch including only four switches and the cover plate covers the four switches, wherein the annular switch* surrounds the center switch, the annular switch being adapted to operate independently from the center switch; wherein the annular switch is adapted to effect movement of the cursor between the plurality of choices and the center switch is adapted to effect selection of one of the choices identified by the cursor;
   electronic means adapted to generate a signal upon activation of one of the switches; and
   transmitting means for transmitting the signal from the electronic means.

8. A control mechanism comprising:
   a display peripheral including a set of choices and a cursor, each choice having a set of sub-choices from which a selection of one or more sub-choices is desired, the cursor being movable between the choices and the sub-choices; and
   a control device including a multiple function, thumb switch, the thumb switch including a center switch [and], an annular switch *including only four switches* substantially surrounding the center switch, *and a cover plate that covers the annular switch, wherein* the annular switch being adapted to effect movement of the cursor between the plurality of choices and sub-choices and the center switch being adapted to effect selection of one of the choices and sub-choices identified by the cursor, wherein the annular switch is adapted to operate independently of the center switch.

*17. A control mechanism comprising:*
   *a display peripheral including a set of choices and a cursor, each choice having a set of sub-choices from which a selection of one or more sub-choices is desired, the cursor being movable between the choices and the sub-choices;*
   *a control device including a multiple function thumb switch, the thumb switch including a center switch, an annular switch having only four switches that substantially surround the center switch, and a cover plate that covers a plurality of these switches, the annular switch being adapted to effect movement of the cursor between the plurality of choices and sub-choices and the center switch being adapted to effect selection of one of the choices and sub-choices identified by the cursor, wherein the annular switch is adapted to operate independently of the center switch; and*
   *a hand held device having, the multi-function thumb switch that is able to be operated by either hand's thumb and a display screen of the display peripheral as part of the hand held device.*

\* \* \* \* \*